Patented Apr. 6, 1926.

1,579,248

UNITED STATES PATENT OFFICE.

GUSTAVE JEAN ROY, OF LYON, FRANCE, ASSIGNOR TO SOCIETE CHIMIQUE DES USINES DU RHONE, OF PARIS, FRANCE.

PROCESS OF MANUFACTURE OF ACETIC ANHYDRIDE AND ALDEHYDE.

No Drawing.    Application filed July 10, 1925. Serial No. 42,827.

*To all whom it may concern:*

Be it known that I, GUSTAVE JEAN ROY, a citizen of the Republic of France, residing in Lyon, France, have invented certain new and useful Improvements in Processes of Manufacture of Acetic Anhydride and Aldehyde, of which the following is a specification.

The present invention relates to a process of manufacture of acetic anhydride and aldehyde by the decomposition of ethylidene diacetate, according to the reaction:

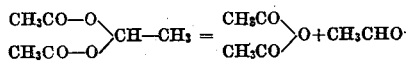

In all the known processes having for their purpose the realization of this decomposition, secondary reactions occur which give birth, particularly, to notable quantities of acetic acid and tar. These secondary reactions are due to the too energetic condensing action of the catalysts employed for the decomposition.

I have found that halogenated zinc derivatives, as well as compounds capable of giving these derivatives in the presence of zinc (for instance, acetyl chloride or bromide), in quantities even inferior to 1% of the weight of the diacetate employed, allowed this decomposition to be performed in an almost quantitive manner, according to the above reaction.

I have found, moreover, that in order that the decomposition of the diacetate should take place in a regular manner, it is necessary to withdraw, as they are formed, the anhydride and the aldehyde from the reacting medium.

I have, besides, noticed that, during the reaction, the halogen is gradually carried away by the anhydride and aldehyde vapors which are evolved, and, in order to obviate this destruction of the catalyst, I feed the reacting medium with ethylidene diacetate containing in solution a little of the selected halogenated derivative.

Besides, I hold back the greatest portion of the halogen which escapes during the decomposition, by causing the distilling vapors to pass through a column full of zinc presenting a large surface (shavings, turnings, threads, etc.).

Moreover, I operate the fractionated condensation of the distilled vapors which allows one to obtain directly pure acetaldehyde and raw acetic anhydride containing a quantity more or less small of diacetate and of acetaldehyde.

When the decomposition is performed in accordance with these indications, the decomposed diacetate separates into acetic anhydride and aldehyde only, and the quantity of tar formed is quite small.

*Example.*

0.5 gram of anhydrous zinc chloride is dissolved, with heat, in 5 grams of acetic acid, and this solution is incorporated with 300 grams of ethylidene diacetate.

80 grams of this mixture are caused to pass into a flask on which is mounted a column, 10 cms. in height, filled with zinc millings and heat is applied. As soon as the temperature of the liquid reaches 145° C., aldehyde begins to be evolved; it is caused to pass through a second column, where it is freed from the anhydride which has been carried away, and it is collected in a flask immersed in a mixture of ice and common salt.

The temperature of the liquid in the flask, which had risen to 165° C., returns to 150° C., owing to the formation of anhydride which lowers the boiling point of the mixture. The heating is regulated in such a manner that the temperature at the top of the columns of zinc millings is maintained at about 130° C. The supply of ethylidene diacetate containing zinc chloride is regulated so as to maintain constant the level in the flask.

The apparatus is maintained at the prescribed temperature until the end of the operation, which is terminated at the end of two and a half hours.

56.80 grams of acetaldehyde are collected in the cooled flask. The distilled raw anhydride contains 28% diacetate carried off, and about 2% acetaldehyde. There remains in the flask (returned back from the column) a mixture of anhydride and of undecomposed diacetate. By fractionating the raw anhydride and the diacetate remaining in the flask, after having stopped the action of the catalyst by the addition of a suitable compound, such as potassium acetate, one obtains:

5.05 grams of aldehyde dissolved in raw anhydride, 151.5 grams of pure anhydride, 77.8 grams of recovered ethylidene diacetate, 2.02 grams of tar from the reaction flask. These figures show that the decomposition has taken place regularly. The yields are excellent; the 222.2 grams of diacetate have given 61.6 grams of aldehyde and 151.5 grams of anhydride, instead of 66.9 and 155.2 grams, which are the theoretical yields respectively.

What I claim and desire to secure by Letters Patent is:—

1. A process for the manufacture of acetic anhydride and aldehyde by decomposition of ethylidene diacetate, characterized by the use as decomposition catalyst, of a halogenated zinc derivative.

2. A process for the manufacture of acetic anhydride and aldehyde by decomposition of ethylidene diacetate, characterized by the use, as decomposition catalyst, of a halogenated zinc derivative, the said catalyst being capable of being used even in quantities inferior to 1% of the weight of the diacetate.

3. A process for the manufacture of acetic anhydride and aldehyde by decomposition of ethylidene diacetate, as claimed in claim 1, the halogenated zinc derivative being produced in situ by the action of a halogen compound adapted to reproduce such a derivative in the presence of zinc.

4. A process for the manufacture of acetic anhydride and aldehyde by decomposition of ethylidene diacetate, as claimed in claim 1, the halogenated zinc derivative being produced in situ by the action of acetyl chloride on zinc.

5. A process for the manufacture of acetic anhydride and aldehyde, as claimed in claim 1, further characterized in that ethylidene diacetate, containing a halogenated zinc derivative, is heated to a temperature near to, but not above, its boiling point, the anhydride and acetaldehyde produced being separated as they are formed.

In testimony whereof I have signed my name to this specification.

GUSTAVE JEAN ROY.